(12) United States Patent
Tedeschi

(10) Patent No.: US 8,070,403 B2
(45) Date of Patent: Dec. 6, 2011

(54) SCREW WITH BREAKAWAY AND METHODS OF USING THE SAME

(75) Inventor: Nancy Tedeschi, Rexford, NY (US)

(73) Assignee: Eyeego LLC, East Wenatchee, WA (US)

( * ) Notice: Subject to any disclaimer, the term of this patent is extended or adjusted under 35 U.S.C. 154(b) by 78 days.

(21) Appl. No.: 12/187,254

(22) Filed: Aug. 6, 2008

(65) Prior Publication Data

US 2009/0041559 A1 Feb. 12, 2009

Related U.S. Application Data

(60) Provisional application No. 60/963,519, filed on Aug. 6, 2007, provisional application No. 60/993,726, filed on Sep. 14, 2007.

(51) Int. Cl.
*F16B 31/00* (2006.01)

(52) U.S. Cl. ............... 411/5; 411/2; 411/403; 411/411; 411/424

(58) Field of Classification Search ............ 411/1–3, 411/5, 366.1, 402–404, 409–411, 424, 431, 411/999
See application file for complete search history.

(56) References Cited

U.S. PATENT DOCUMENTS

| | | | |
|---|---|---|---|
| 869,443 A * | 10/1907 | Lund | 81/471 |
| 933,831 A * | 9/1909 | De Steiger | 411/403 |
| 1,039,576 A * | 9/1912 | Mueller et al. | 292/307 B |
| 1,541,518 A | 6/1925 | McCain | |
| 1,662,834 A | 3/1928 | Reiter | |
| 1,970,071 A * | 8/1934 | Bengtsson | 40/203 |
| 2,177,978 A | 10/1939 | Darvie | |
| 2,230,984 A | 2/1941 | Chernow | |
| 2,247,499 A * | 7/1941 | Hutchison, Jr. | 411/378 |
| 2,382,019 A | 8/1945 | Miller | |
| 2,408,559 A * | 10/1946 | Keating | 411/17 |
| 2,542,340 A | 2/1951 | Mauraton | |

(Continued)

FOREIGN PATENT DOCUMENTS

JP 4-46420 U 4/1992

OTHER PUBLICATIONS

Cameron & Barkley Company Catalog No. 26 (c) 1926 pp. 173, 187.

*Primary Examiner* — Victor Batson
*Assistant Examiner* — Roberta Delisle
(74) *Attorney, Agent, or Firm* — GFD Patents LLC; Gerald F. Dudding

(57) ABSTRACT

A fastener with a breakaway and methods of using the same. In one embodiment the fastener is a screw having a head and elongated stem, adapted to be easily manipulated by a user when using the screw as a fastener in a hinge or joint. A means of holding a screw by providing a breakaway tab or non-threaded second portion of the elongated stem which can be used to align and insert the screw into a screw hole in the process of engaging threads in the screw hole with threads of the screw. After engaging the threads in the screw hole, such as after the screw has been essentially completely inserted into the screw hole, the breakaway tab or non-threaded second portion of the elongated stem of the screw may be broken off at a breakaway and discarded.

62 Claims, 7 Drawing Sheets

U.S. PATENT DOCUMENTS

| | | | |
|---|---|---|---|
| 2,552,265 A | | 5/1951 | Edwards |
| 2,636,194 A | * | 4/1953 | Schneider .................. 470/11 |
| 3,208,328 A | * | 9/1965 | Myers ...................... 411/386 |
| 3,307,444 A | | 3/1967 | Money |
| 3,343,443 A | * | 9/1967 | Moore ........................ 411/5 |
| 3,941,027 A | * | 3/1976 | Gibson et al. ............. 411/43 |
| 3,968,661 A | | 7/1976 | Williams |
| 4,345,848 A | | 8/1982 | Cheselka |
| 4,492,500 A | * | 1/1985 | Ewing ......................... 411/5 |
| 4,838,746 A | * | 6/1989 | Giannuzzi ................ 411/504 |
| 5,077,931 A | | 1/1992 | Marshall |
| 5,161,234 A | | 11/1992 | Nitta |
| 5,415,507 A | * | 5/1995 | Janusz et al. ............... 411/5 |
| 5,499,892 A | * | 3/1996 | Reed ........................... 411/5 |
| 5,615,850 A | | 4/1997 | Cloninger |
| 5,651,652 A | | 7/1997 | Williams et al. |
| 5,675,988 A | | 10/1997 | Ignatowski |
| 5,697,743 A | * | 12/1997 | Parker ........................ 411/5 |
| 5,699,140 A | | 12/1997 | Fuhrman |
| 5,746,096 A | * | 5/1998 | Lukes ......................... 81/54 |
| 5,746,556 A | * | 5/1998 | Sato .......................... 411/42 |
| 5,863,168 A | | 1/1999 | Demaray |
| 5,893,538 A | * | 4/1999 | Onishi et al. .............. 248/65 |
| 5,896,184 A | | 4/1999 | Lowe et al. |
| 5,906,029 A | | 5/1999 | Fox |
| 5,928,236 A | * | 7/1999 | Augagneur et al. ...... 606/305 |
| 6,077,012 A | * | 6/2000 | Granese et al. .......... 411/361 |
| 6,152,737 A | | 11/2000 | Beaty et al. |
| 6,454,768 B1 | * | 9/2002 | Jackson ................... 606/305 |
| 6,520,635 B1 | | 2/2003 | Ignatowski |
| 6,863,394 B1 | | 3/2005 | Nelson et al. |
| 2001/0048860 A1 | | 12/2001 | Ross et al. |
| 2006/0039772 A1 | * | 2/2006 | Matthys-Mark ............ 411/5 |
| 2007/0228743 A1 | | 10/2007 | Kawano |

* cited by examiner

SCREW WITH BREAKAWAY AND METHODS OF USING THE SAME

The present patent application is a non-provisional application claiming priority from provisional applications with Ser. Nos. 60/963,519 (filed Aug. 6, 2007 and titled "IBOB (Specialize Screw)") and 60/993,726 (filed Sep. 14, 2007 and titled "IBOB").

FIELD OF THE INVENTION

The present invention relates generally to fasteners. More specifically, the invention relates to screws and their use in joints.

BACKGROUND

Small, hand held fastening devices are used in the mechanical and construction industries.

There is an increasing need for adaptations that facilitate the manipulation of such small, hand held fastening devices.

SUMMARY OF THE INVENTION

A first aspect of the present invention provides a screw, comprising: a screw head, comprising: a first surface having a driver slot thereon, and a second surface, wherein the second surface of the screw head faces away from the first surface; an elongated stem, comprising: either a threaded first portion and a non-threaded second portion extending from the distal end of the threaded first portion and a first breakaway therebetween, wherein a proximal end of the threaded first portion is mechanically and physically coupled to the second surface of the screw head, wherein the physical coupling between the second surface of the screw head and the proximal end of the threaded first portion is not a breakaway, wherein the first breakaway releasably couples the non-threaded second portion to the distal end of the threaded first portion, or a threaded first portion, without the non-threaded second portion extending from the threaded first portion and a second breakaway, wherein a proximal end of the threaded first portion is non-releasably mechanically and physically coupled to the second surface of the screw head, wherein the mechanical and physical coupling between the second surface of the screw head and the proximal end of the threaded first portion is not a breakaway, and wherein the second breakaway releasably couples the first surface of the screw head to a breakaway tab.

A second aspect of the present invention provides a method of replacing a screw in a hinge, comprising: providing a hinge, comprising: first and second straps, pivotably coupled to a cylinder, wherein the cylinder has a threaded hollow channel therein; providing a screw comprising: a head; an elongated stem comprising: either a threaded first portion adjacent to the head; and a non-threaded second portion extending from the threaded first portion; and a first breakaway therebetween, wherein the first breakaway releasably couples the non-threaded second portion to the distal end of the threaded first portion, or a threaded first portion adjacent to the head without the non-threaded second portion extending from the threaded first portion and a second breakaway, wherein the second breakaway releasably couples the first surface of the screw head to a breakaway tab; inserting the non-threaded second portion of the elongated stem into the hollow threaded channel in the hinge so that the non-threaded second portion of the elongated stem extends out of the hollow threaded channel of the hinge; or inserting the threaded portion of the elongated stem into the hollow threaded channel in the hinge by a user manipulating the insertion using the breakaway tab; aligning the threaded first portion of the elongated stem with the threads of the hollow threaded channel of the hinge; and screwing the first threaded portion of the elongated stem into the hollow threaded channel of the hinge by rotating the threaded first portion of the elongated stem that has been aligned with the threads of the threaded hollow channel of the hinge.

A third aspect of the present invention provides a kit, comprising: a hinge, comprising first and second straps, pivotably coupled to a cylinder, wherein the cylinder has a threaded hollow channel therein; a screw, comprising: a head; an elongated stem, comprising: either a threaded first portion adjacent to the head and a non-threaded second portion extending from the threaded first portion and a first breakaway therebetween, wherein the first breakaway releasably couples the first threaded portion of the elongated stem to the non-threaded second portion of the elongated stem, wherein the non-threaded second portion of the elongated stem has been aligned with the hollow threaded channel in the hinge, and wherein the non-threaded second portion of the elongated stem has been inserted into the hollow threaded channel in the hinge so that the threaded first portion of the elongated stem catches at least one of the threads of the hollow threaded channel of the hinge; or a threaded first portion physically and mechanically non-releasably coupled to the second surface of the screw head without the non-threaded second portion extending from the threaded first portion and a second breakaway, wherein the second breakaway releasably couples the first surface of the screw head to a breakaway tab, wherein the proximal end of the threaded portion and the second surface of the screw head are non-releasably coupled, and wherein the threaded first portion of the elongated stem has caught at least one thread of the hollow threaded channel of the hinge, by threading the threads of the first portion of the elongated stem with the threads of the hollow threaded channel.

A fourth aspect of the present invention provides a system for guiding a screw into a hinge, comprising: a hinge, wherein the hinge has a hollow channel therein; a screw, comprising: a head; an elongated stem, comprising: a threaded first portion adjacent to the head; and a non-threaded second portion extending from the threaded first portion; and a breakaway, wherein the breakaway is removably connected therebetween or removably connected to the first surface of the screw head, but the breakaway is not removably connected between the threaded first portion of the elongated stem and the head of the screw, wherein the non-threaded second portion of the elongated stem has been aligned with the hollow threaded channel in the hinge, wherein the non-threaded second portion of the elongated stem has been manipulated into the threaded hole in the hinge so that the threaded first portion of the elongated stem is articulated with the threads of the hollow threaded channel of the hinge, and wherein the screw has been inserted into the threaded first portion of the elongated stem by threading the threads of the first portion of the elongated stem with the threads of the threaded hole.

BRIEF DESCRIPTION OF THE FIGURES

FIG. 2A depicts a front longitudinal view of a screw, in accordance with embodiments of the present invention;

FIG. 3A depicts a side elevation view of the screw the screw depicted in FIGS. 2A and 2B, in accordance with embodiments of the present invention;

DETAILED DESCRIPTION OF EMBODIMENTS OF THE INVENTION

Figure 1A:
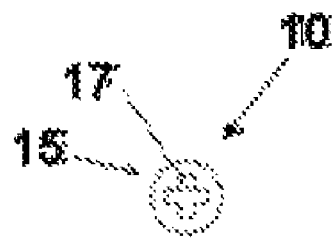
FIG. 1A depicts a top plan view of a first surface of a screw head of a screw, in accordance with embodiments of the present invention.

FIG. 1A depicts a top plan view of a first surface 19 of a screw head 15 of a screw 10. The screw head 15 includes a driver slot 17. The screw 10 may be a round head 15 made of stainless steel, brass, nickel/sliver, carbon steel, titanium, or other appropriate metals or metal alloys. The driver slot 17 may be a single groove, a Phillips® cross shaped groove, an hexagonal groove for turning with a hex wrench.

Figure 1B:
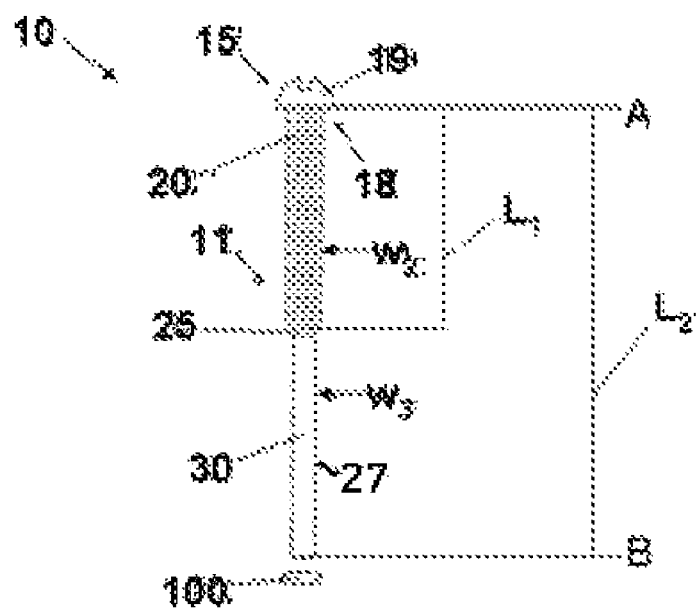
FIG. 1B depicts a longitudinal cross-sectional view of the screw depicted in FIG. 1A, in accordance with embodiments of the present invention.

FIG. 1B depicts a longitudinal cross-sectional view of the screw 10. The screw 10, comprises: the screw head 15, comprising: a first surface 19 having a driver slot 17 thereon, and a second surface 18, wherein the second surface 18 of the screw head 15 faces away from the first surface 19. The screw 10 comprises an elongated stem 11. The elongated stem 11 comprises a threaded first portion 20. A proximal end A of the threaded first portion 20 is mechanically and physically coupled to the second surface 18 of the screw head 15. The mechanical and physical coupling between the second surface 18 of the screw head 15 and the proximal end A of the threaded first portion 20 is not a breakaway 25, 43. The elongated stem 11 comprises a non-threaded second portion 30 extending from a distal end C of the threaded first portion 20; and a breakaway 25 therebetween.

Hereinafter, a "breakaway" is defined as a releasable coupling between a removable piece such as the proximal end 12 of the non-threaded second portion 30 and the distal end C of the threaded first portion 20. Hereinafter, "distal end" is defined as the further point along the elongated stem 11 in reference to the second surface 18 of the screw head 15, and "proximal" is defined as the nearer point along the elongated stem 11 in reference to the second surface 18 of the screw head 15.

Hereinafter "releasably coupling" is defined as forming or breaking or cleaving or severing a mechanical and physical coupling between the removable piece such as the proximal end 12 of the non-threaded second portion 30 and the distal end C of the threaded first portion 20.

Hereinafter "screwing the screw 10, 13 into a screw hole 59, 100 or threaded hollow channel of a hinge 64" is defined as engaging the threads 63 in the screw hole 59, 100 or hollow threaded channel 64 of a hinge 66, by rotating the screw 10, 13 about its longitudinal axis in a clockwise motion, resulting in the screw 10, 13 being essentially completely inserted into the screw hole 59, 100 or hollow threaded channel 64 of the hinge 66. Such engaging the threads 63 in the screw hole or hollow threaded channel 64 has the ultimate end that the screw 10, 13 has been essentially completely inserted into the screw hole 59, 100.

In one embodiment, the screw 10 comprises a non-threaded second portion 30 for making it easier to handle the screw 10. You insert the non-threaded second portion 30 of the screw 10 into a screw hole 100 first and then you are able to pull the threaded first portion 20 of the screw 10 into the screw hole 100 as the non-threaded second portion 30 is removed from the screw hole 100. This adapts the screw 10 to be more easily manipulated by hand by a user.

In one embodiment, a length $L_1$ from about 0.3375 in. to about 0.4125 in. may separate the proximal end A of the threaded first portion 20 and the distal end C of the threaded first portion 20.

In one embodiment, a length $L_2$ from about 0.6973 in. to about 0.8525 in. may separate the proximal end A of the threaded first portion 20 and the distal end B of the non-threaded second portion 30 of the elongated stem 11.

In one embodiment, a diameter $W_3$ of the non-threaded second portion 30 is preferably smaller than a diameter $W_2$ of the threaded first portion 20 of the elongated stem 11. In one embodiment the diameter $W_3$ is from about 0.036 in. to about 0.044 in.

In one embodiment an axial cross-section of the non-threaded second portion 30 is substantially circular. In this embodiment, an outer surface 27 of the non-threaded second portion 30 is substantially smooth.

FIG. 2A depicts a front longitudinal view of a screw 13. The screw 13 comprises: a screw head 50 and an elongated stem 14. The screw head 50, comprises: a first surface 44 having a driver slot 51 thereon. The screw head 50, comprises a second surface 48, depicted in FIG. 3A and described in associated text. The second surface 48 of the screw head 50 faces away from the first surface 44. The elongated stem 14, comprises: either a threaded first portion 20 and a non-threaded second portion 30 extending from the distal end C of the threaded first portion 20 and a first breakaway 25 therebetween, depicted in FIG. 1B, or a threaded first portion 42, without the non-threaded second portion 30, depicted in FIG. 1B, extending from the threaded first portion 42 and a second breakaway 43. A proximal end E of the threaded first portion 42 is non-releasably coupled to the second surface 48 of the screw head 50. The mechanical and physical coupling between the second surface 48 of the screw head 50 and the proximal end E of the threaded first portion 42 is not a breakaway 25, 43. In this embodiment, the first breakaway 25 releasably couples the non-threaded second portion 30 to the distal end C of the threaded first portion 20.

In an alternative embodiment the threaded first portion 42, without the non-threaded second portion 30 extends from the threaded first portion 42 and a second breakaway 43. In this embodiment, a proximal end E of the threaded first portion-42 is non-releasably mechanically and physically coupled to the second surface 48 of the screw head 50. In this embodiment, the mechanical and physical coupling between the second surface 48 of the screw head 50 and the proximal end E of the threaded first portion 42 is not a breakaway 25, 43. In addition, the second breakaway 43 releasably couples the first surface 48 of the screw head 50 to a breakaway tab 45.

In one embodiment, a screw 13 with a breakaway tab 45 on the screw head 50 guides screws 13 into a screw hole 59 for easy maneuverability. Any size screw 13, or breakaway tab 45 may be placed anywhere on the head 50 of the screw 13. Insert the screw 13 in hole 59, turn the breakaway tab 45 to start the screwing operation and then break the breakaway tab 45 off.

In one embodiment, a length $L_5$ from the second surface 48 to the second breakaway 43, releasably coupling the breakaway tab 45, may be from about 0.1 in. to about 0.21 in.

In one embodiment, a width $W_7$ of the breakaway tab 45 may be from about 0.225 in. to about 0.275 in. and a length $L_3$ of the breakaway tab 45 may be from about 0.45 in. to about 0.55 in.

Figure 2B:
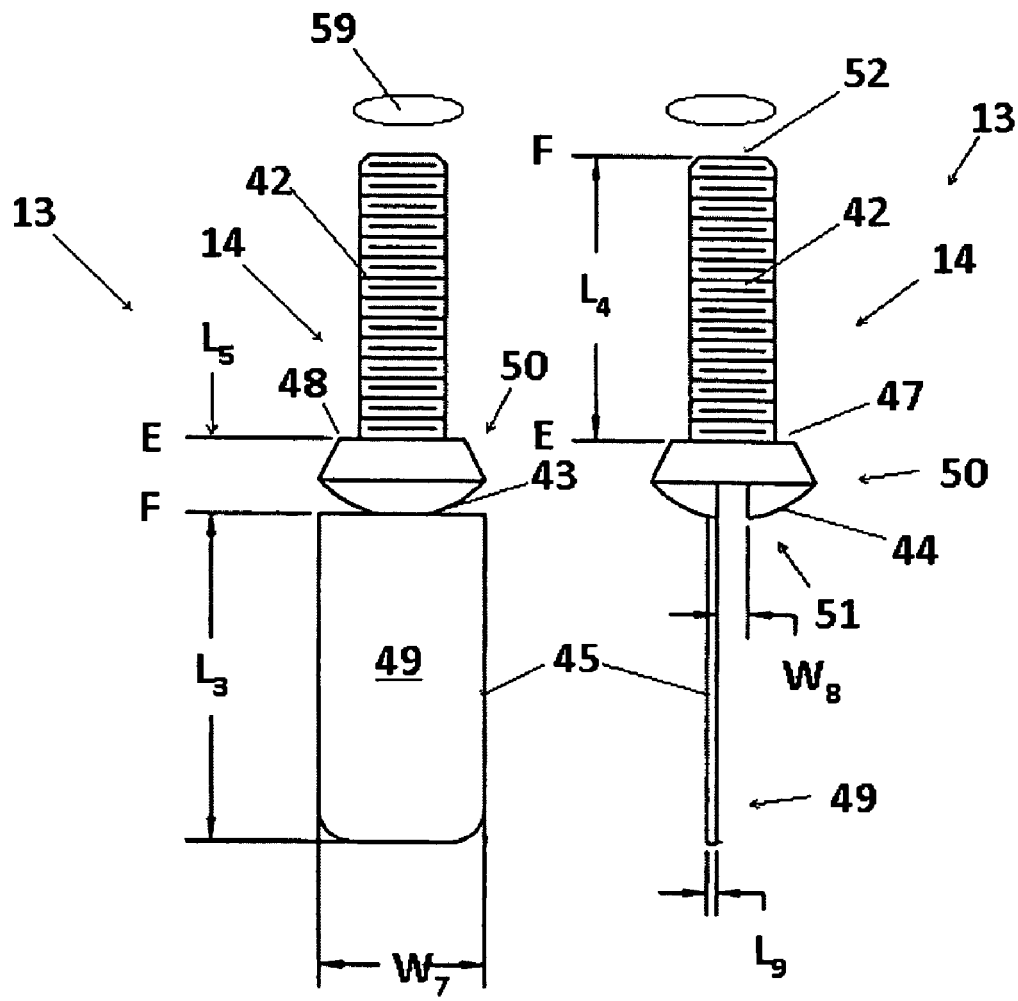
FIG. 2B depicts a top plan view of a first surface of a screw head of the screw depicted in FIG. 2A, in accordance with embodiments of the present invention.

FIG. 2B depicts a top plan view of a first surface 44 of a screw head 50 of the screw 13. The screw head 50 includes a driver slot 51. The screw 13 may be made of stainless steel, brass, nickel/sliver, carbon steel, titanium, or other appropriate metals or metal alloys. The driver slot 51 may be a single groove, a Phillips® cross shaped groove, or an hexagonal groove for turning with a hex wrench.

FIG. 3A depicts a side elevation view of the screw 13. In one embodiment, a length $L_4$ from the proximal end E of the threaded first portion 20 to the distal end F of the threaded first portion 42 of the elongated stem 14 may be from about 0.3942 in. to about 0.4818 in.

In one embodiment, a face 49 of the breakaway tab 45 and a longitudinal plane of the driver slot 51 are parallel. A width $W_8$ of the driver slot 51 may be from about 0.045 in. to about 0.055 in. A ratio of the thickness $L_9$ of the breakaway tab 45 of the screw 13 to the width $W_8$ of the driver slot 51 is from about 0.3:1.0 to about 0.4:0.9.

Figure 4:
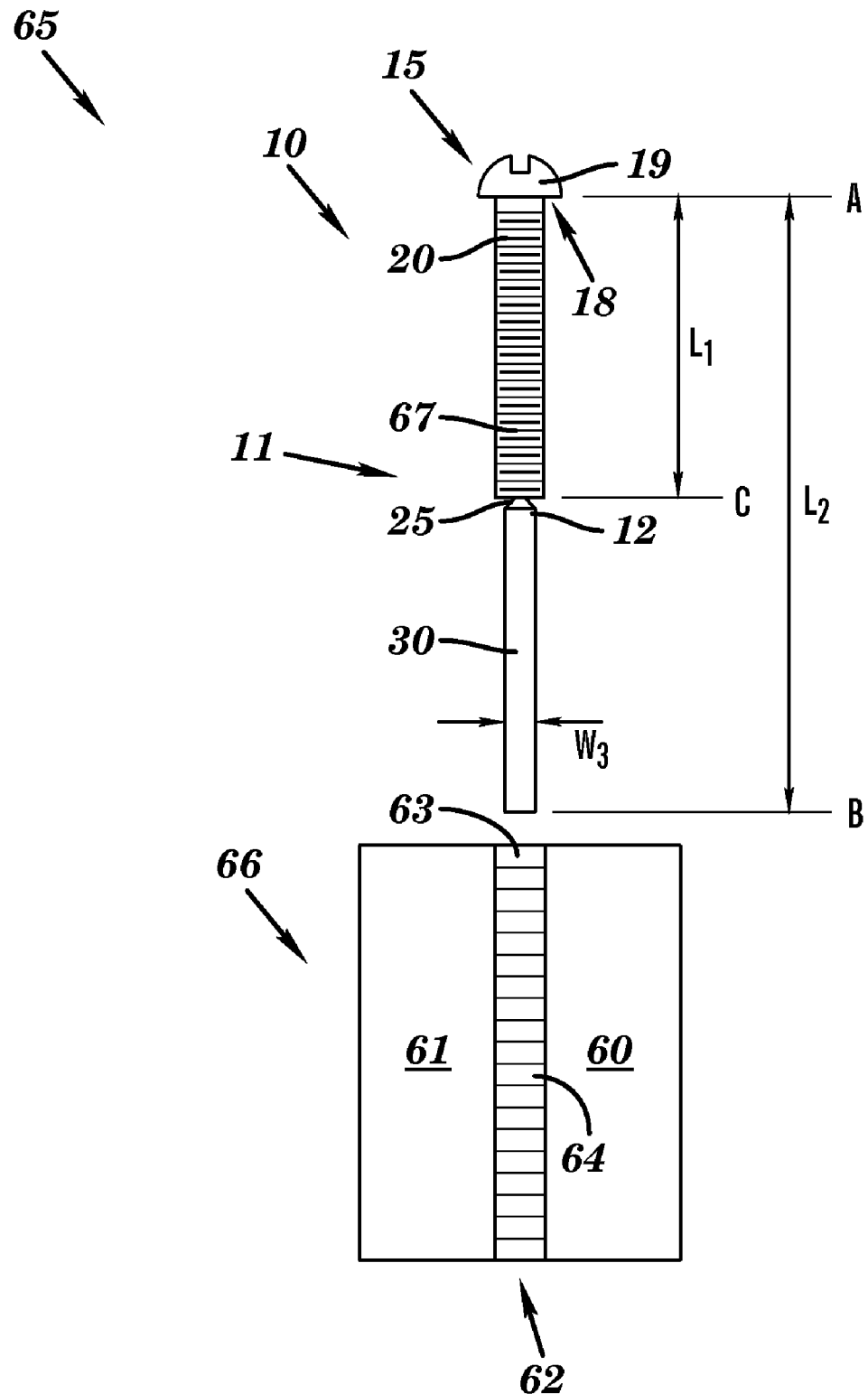
FIG. 4 depicts a longitudinal cross-sectional view of a kit, in accordance with embodiments of the present invention.

In one embodiment, a ratio of the length $L_1$ of the threaded first portion 20 to a length of the non-threaded second portion 30 of the screw 10 is from about 1:1 to about 0.775:1. The length of the non-threaded second portion is defined as a length between proximal end 12 of the non-threaded second portion 30 and the distal end B of the non-threaded second portion 30 of the elongated stem 11, as depicted in FIGS. 1B and 4, and described in associated text, herein.

In one embodiment, a diameter of the first breakaway 25 of the screw 10 is less than or equal to 0.015 in., when the diameter of the elongated stem 11 is essentially equal to 0.040 in.

In one embodiment, a ratio of the width $W_1$ of the breakaway tab 45 to a length $L_3$ of the breakaway tab 45 is from about 1:2 to about 1:10.

In one embodiment, the screw head 50 is a slotted undercut oval countersunk head.

In one embodiment, the threaded first portion 42 has a 6-32 UNF thread, wherein conventional UNC or UNF thread is a 60 degree thread.

In one embodiment, a ratio of the length $L_4$ of the threaded first portion 42 to the length $L_3$ of the breakaway tab 45 of the screw 10 is from about 1:1 to about 0.876:1.

Figure 3B:
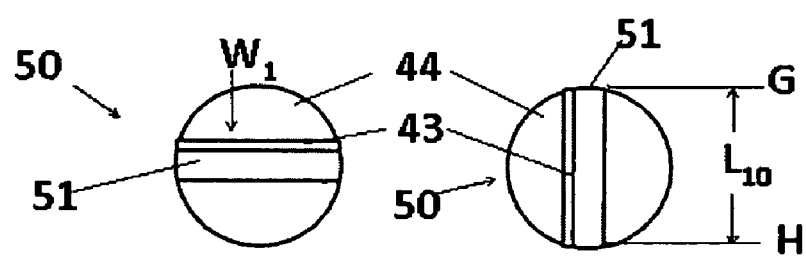
FIG. 3B depicts a top plan view of a first surface of a screw head of the screw depicted in FIGS. 2A, 2B, and 3A, in accordance with embodiments of the present invention.

FIG. 3B depicts a top plan view of a first surface 44 of a screw head 51 of the screw 50. In one embodiment, a width $W_1$ of the second breakaway 43 across the first surface 44 of the screw head 50, depicted in FIG. 2B, is from about 75% to about 95% of the length $L_{10}$ of the driver slot 51 thereon.

FIG. 4 depicts a longitudinal cross-sectional view of a kit 65. In one embodiment, the kit 65 comprises: a hinge 66, comprising first and second straps 60, 61, pivotably coupled to a cylinder 62. The cylinder 62 has a hollow threaded channel 64 therein. The kit 65 comprises: a screw 10, comprising: a head 19 and an elongated stem 11. The elongated stem 11, comprises: either a threaded first portion 20 adjacent to the head 15 and a non-threaded second portion 30 extending from the threaded first portion 20 and a first breakaway 25 therebetween. The first breakaway 25 releasably couples the threaded first portion 20 of the elongated stem 11 to the non-threaded second portion 30 of the elongated stem 11. The non-threaded second portion 30 of the elongated stem 11 has been aligned with the hollow threaded channel 64 in the hinge 66. The non-threaded second portion 30 of the elongated stem 11 has been inserted into the hollow threaded channel 64 in the hinge 66 so that the threaded first portion 20 of the elongated stem 11 catches at least one of the threads 63 of the hollow threaded channel 64 of the hinge 66.

Alternatively, the kit 65 comprises; a screw 13, depicted in FIGS. 2A, 2B, and FIGS. 3A, 3B. The screw 13 comprises: a screw head 50 and an elongated stem 14.

The elongated stem 14 comprises a threaded first portion 42 physically and mechanically non-releasably coupled to the second surface 48 of the screw head 50 without the non-threaded second portion 30, depicted in FIGS. 1A, B extending from the threaded first portion 42 and a second breakaway 43. The second breakaway 43 releasably couples the first surface 44 of the screw head 50 to a breakaway tab 45. The threaded first portion 42 of the elongated stem 11 has caught at least one thread 63 of the hollow threaded channel 64 of the hinge 66, by threading the threads 67 of the threaded first portion 20 of the elongated stem 11 with the threads 63 of the hollow threaded channel 64.

In all preferred embodiments, the proximal end E of the threaded first portion 42 and the second surface 48 of the screw head 50 are mechanically and physically non-releasably coupled.

In one embodiment, the breakaway tab 45 extends along a longitudinal axis of the screw 13, away from the first surface 44 of the screw head 50.

Figure 5:
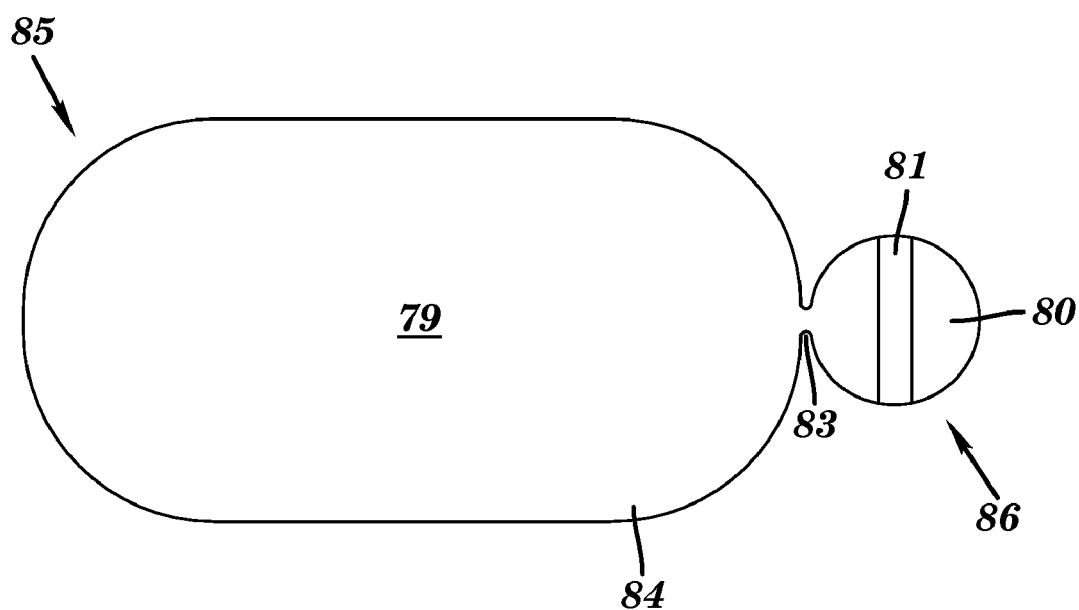
FIG. 5 depicts a top plan view of a screw having a screw head, in accordance with embodiments of the present invention.

FIG. 5 depicts a top plan view of a screw 85 having a screw head 86. The screw head 86 has a first surface 80 and a driver slot 81, therein. The screw head 86 is releasably coupled to a breakaway tab 84, having a breakaway 83 therebetween. The breakaway tab 84 has a first surface 79, and the first surface 79 may be coplanar with the first surface 80 of the screw head 86.

Figure 6A:
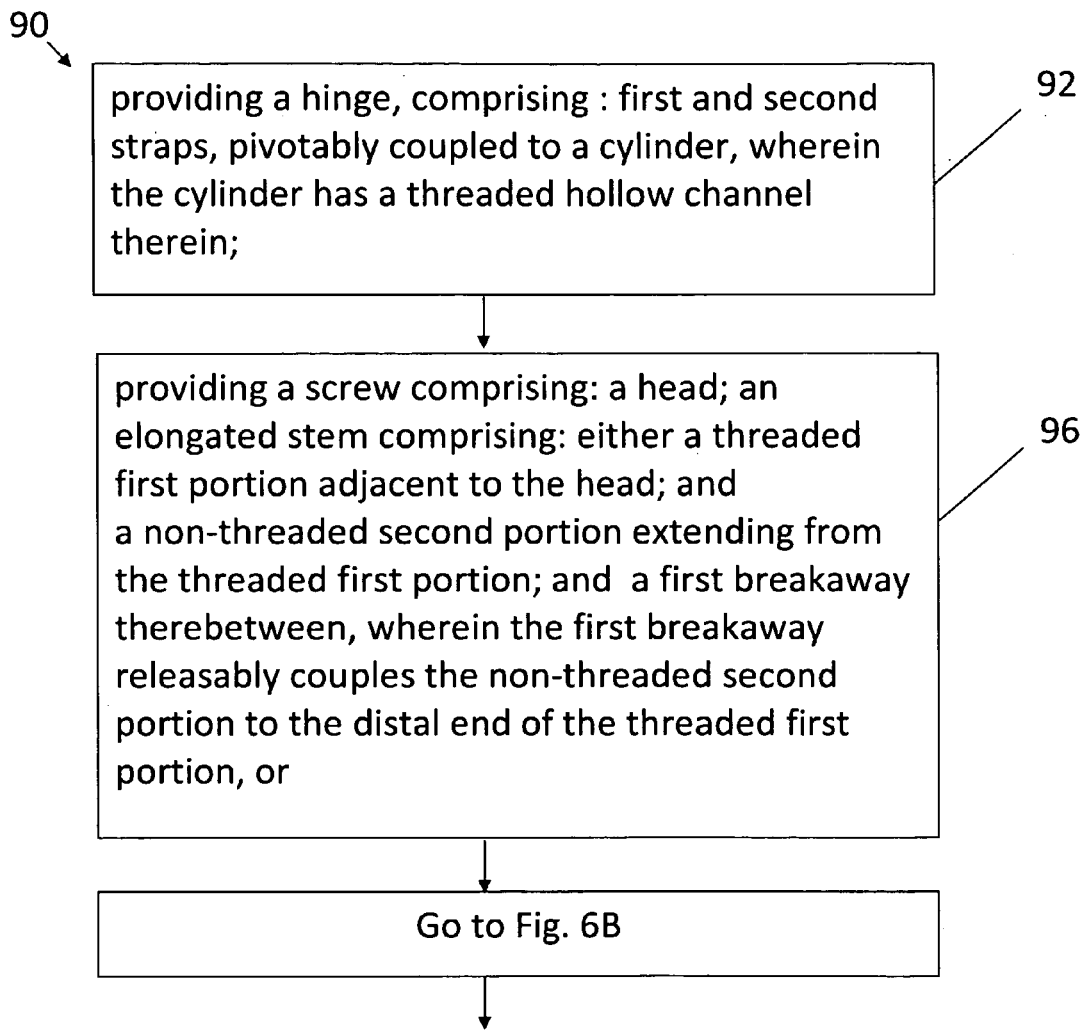
FIGS. 6A-6C depict a flow diagram of a method of replacing a screw in a hinge of the kit, depicted in FIG. 4, in accordance with embodiments of the present invention.
Figure 6B:
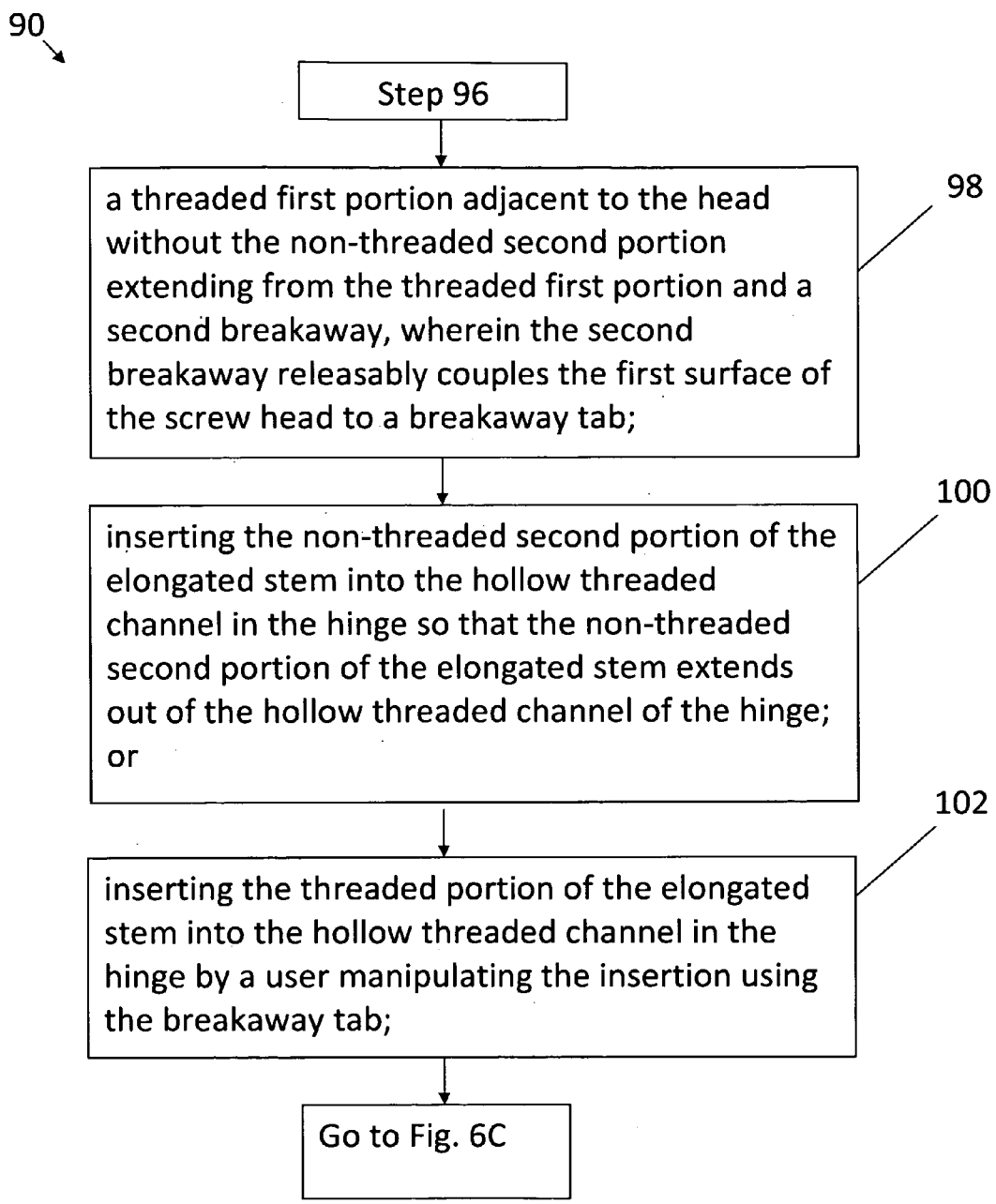
Figure 6C:
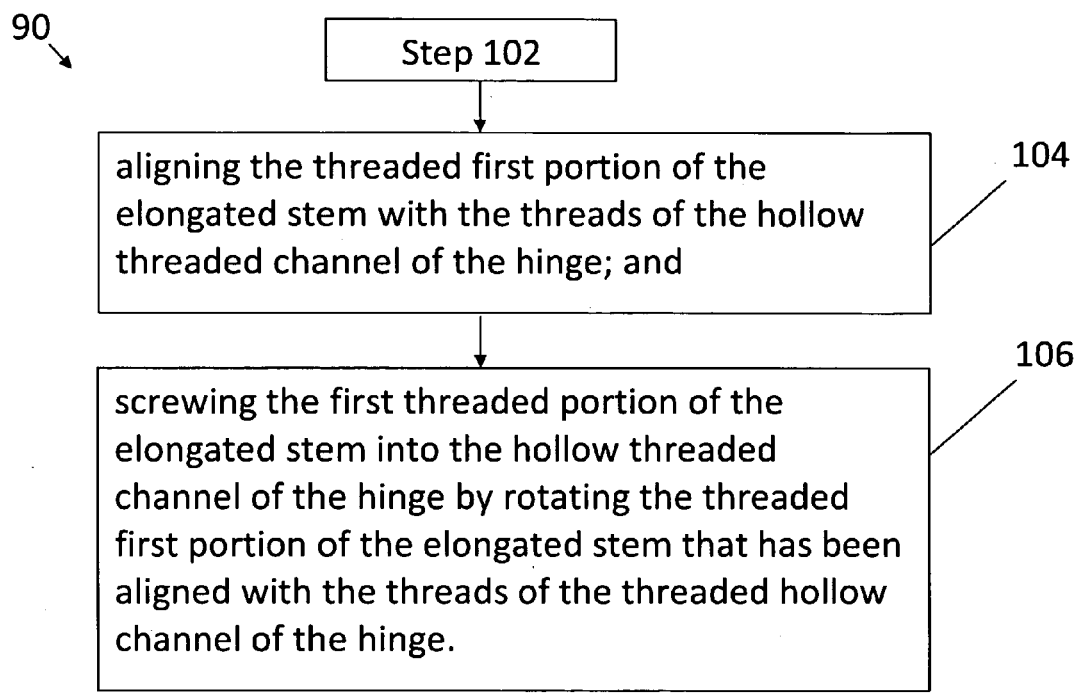

FIGS. 6A-6C depict a flow diagram of a method 90 of replacing a screw 10, 13 in a hinge 66, depicted in FIG. 4, and described in associated text and depicted in FIGS. 2A.-3B, and described in associated text. In a step 92 of the method 90, a hinge 66 is provided. In the step 92 of providing the hinge 66, first and second straps 60, 61 may be pivotably coupled to a cylinder 62. The cylinder 62 has a hollow threaded channel 64 therein;

In a steps 96 and 98 a screw 10, 13 is provided. The screw 10, 13 comprises: a head 15, 50; an elongated stem 11, 14.

In the steps 96, 98 the elongated stem 11, 14 comprises: either a threaded first portion 20, 42 adjacent to the head 15, 50; and a non-threaded second portion 30, extending from the threaded first portion 20, 42; and a first breakaway 25 therebetween, wherein the first breakaway 25 releasably couples the non-threaded second portion 30 to the distal end C of the threaded first portion 20, or a threaded first portion 42 adjacent to the head 50 without the non-threaded second portion 30 extending from the threaded first portion 42 and a second breakaway 43, wherein the second breakaway 43 releasably couples the first surface 44 of the screw head 50 to a breakaway tab 45;

In a step 100 of the method 90, the non-threaded second portion 30 of the elongated stem 11 may be inserted into the hollow threaded channel 64 in the hinge 66 so that the non-threaded second portion 30 of the elongated stem 11 extends out of the hollow threaded channel 64 of the hinge 66.

Alternatively, in the step 102 of the method 90, the threaded first portion 42 of the elongated stem 14 may be inserted into the hollow threaded channel 64 in the hinge 66 by a user manipulating the insertion using the breakaway tab 45.

In a step 104 of the method 90, the threaded first portion 20, 42 of the elongated stem 11, 14 may be aligned with the threads 63 of the hollow threaded channel 64 of the hinge 66.

In a step 106 of the method 90, the first threaded portion 20, 42 of the elongated stem 11, 14 may be screwed into the hollow threaded channel 64 of the hinge 66 by rotating the threaded first portion 20, 42 of the elongated stem 11, 14 that has been aligned with the threads 63 of the threaded hollow channel 64 of the hinge 66.

In one embodiment of the step 102 of the method 90, the breakaway tab 45 extends along a longitudinal axis of the screw 13, away from the first surface 44 of the screw head 50.

In one embodiment of the step 102 of the method 90, a first surface 79 of the breakaway tab 84 and a first surface 80 of the screw head 86 are coplanar, depicted in FIG. 5, and described in associated text.

In one embodiment of the step 106 of the method 90, a user may turn the breakaway tab 45 about its longitudinal axis to rotate the screw 13, wherein the breakaway tab 45 is releasably coupled to the first surface 44 of the screw head 50 by the second breakaway 43.

In one embodiment of the step 106 of the method 90, the breakaway tab 45, 84 is broken off from the first surface 44 of the screw head 50 at the second breakaway 43, or at the second breakaway 83, after the threaded first portion 42 of the elongated stem 14 catches at least one thread 63 of the threaded hollow channel 64 of the hinge 66.

In one embodiment of the step 106 of the method 90, the non-threaded second portion 30 of the elongated stem 11 is broken off at the first breakaway 25 from the threaded first portion 20 of the elongated stem 11 after the threaded first portion 20 of the elongated stem is essentially completely screwed into the threaded hollow channel 64 of the hinge 66.

In one embodiment of the step 102 of the method 90, inserting the non-threaded second portion 30 of the elongated stem 11 into the hollow threaded channel 64 in the hinge 66 so that the non-threaded second portion 30 of the elongated stem 11 extends out of the hollow threaded channel 64 of the hinge 66, by a user pulling the non-threaded second portion 30 of the elongated stem 11.

In one embodiment of the step 106 of the method 90, a user removes the non-threaded second portion 30 from the elongated stem 11 of the screw 10 after catching at least one thread 63 of the hollow threaded channel 64 of the hinge 66.

one embodiment of the step 106 of the method 90, the breakaway tab 45 extends along a longitudinal axis of the screw 13, away from the first surface 44 of the screw head 50 when the breakaway tab 45 is broken off from the first surface 44 of the screw head 50 at the second breakaway 43, after the threaded first portion 42 of the elongated stem 14 catches at least one thread 63 of the threaded hollow channel 64 of the hinge 66.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

I claim:

1. A screw, comprising:
   a screw head, comprising:
      a first surface having a driver slot thereon, and a second surface, wherein the second surface of the screw head faces away from
      the first surface;
   an elongated stem, comprising:
      a threaded first portion and a non-threaded second portion extending from the distal end of the threaded first portion and a breakaway therebetween,
      wherein a proximal end of the threaded first portion is mechanically and physically coupled to the second surface of the screw head,
      wherein the physical coupling between the second surface of the screw head and the proximal end of the threaded first portion is not a breakaway,
      wherein the breakaway releasably couples the non-threaded second portion to the distal end of the threaded first portion,
      wherein a diameter of the non-threaded second portion is smaller than a diameter of the threaded first portion of the elongated stem, and
      wherein the breakaway has a diameter sized so that the non-threaded second portion is directly decoupled from the threaded first portion of the elongated stem at the breakaway by hand, without the use of a tool.

2. The screw of claim 1, wherein the diameter of the breakaway is less than or equal to 0.015 in., when the diameter of the elongated stem is essentially equal to 0.040 in.

3. The screw of claim 1, wherein the threaded first portion has a 6-32 UNF thread, wherein conventional UNC or UNF thread is a 60 degree thread.

4. A releasably coupled screw and extension, comprising:
   a screw, having a screw head, comprising:
      a threaded first portion and a non-threaded second portion extending from the distal end of the threaded first portion and a breakaway therebetween,
      wherein a proximal end of the threaded first portion is mechanically and physically coupled to a second surface of the screw head so that it is not releasably coupled to the second surface of the screw head,
      wherein the physical coupling between the second surface of the screw head and the proximal end of the threaded first portion is not a breakaway,
      wherein the breakaway releasably couples the non-threaded second portion to the distal end of the threaded first portion, and
      wherein a length of the non-threaded second portion is greater than or equal to a length of the threaded first portion, resulting in a user having greater leverage to break off and discard the non-threaded second portion at the breakaway.

5. The screw of claim 4, wherein a clean break results from decoupling the threaded first portion from the non-threaded second portion at the breakaway, so that the breakaway and the non-threaded second portion are essentially completely removed from the threaded first portion.

6. The screw of claim 4, wherein the screw head comprises a first surface having a driver slot thereon, and a second surface, wherein the second surface of the screw head faces away from the first surface.

7. The screw of claim 4, wherein a ratio of the length of the threaded first portion to the length of the non-threaded second portion is about 1:1 to about 0.775:1.

8. The screw of claim 4, wherein a diameter of the non-threaded second portion is smaller than a diameter of the threaded first portion of the elongated stem.

9. The screw of claim 4, wherein a diameter of the breakaway is less than or equal to 0.015 in., when the diameter of the elongated stem is essentially equal to 0.040 in., results the non-threaded second portion of the elongated stem of the screw being adapted to be broken off cleanly at the breakaway.

10. The screw of claim 1, wherein a length of the non-threaded second portion is greater than or equal to a length of the threaded first portion, resulting in a user having greater leverage to break off and discard the non-threaded second portion at the breakaway.

11. The screw of claim 10, wherein a ratio of the length of the threaded first portion to the length of the non-threaded second portion is from about 1:1 to about 0.775:1.

12. The screw of claim 11, wherein at least a distal end of the non-threaded second portion extends out of a threaded channel of a hinge.

13. The screw of claim 12, wherein the screw is adapted to engage threads of the channel.

14. The screw of claim 1, wherein an axial cross-section of a distal end of the non-threaded second portion is substantially circular, so the screw is adapted to be manipulated by hand by a user without the use of a tool.

15. The screw of claim 14, wherein an outer surface of the non-threaded second portion is substantially smooth.

16. The screw of claim 1, wherein a clean break results from decoupling the threaded first portion from the non-threaded second portion at the breakaway, so that the breakaway and the non-threaded second portion are essentially completely removed from the threaded first portion.

17. An apparatus, comprising:
a screw, having a screw head, comprising:
a threaded first portion and a non-threaded second portion extending from the distal end of the threaded first portion and a breakaway therebetween,
wherein a proximal end of the threaded first portion is mechanically and physically coupled to a second surface of the screw head so that it is not releasably coupled to the second surface of the screw head,
wherein the screw is adapted to be manipulated by hand by a user without the use of a tool,
wherein the physical coupling between the second surface of the screw head and the proximal end of the threaded first portion is not a breakaway,
wherein the breakaway releasably couples the non-threaded second portion to the distal end of the threaded first portion,
wherein the breakaway releasably couples the non-threaded second portion to the distal end of the threaded first portion,
wherein at least the distal end of the non-threaded second portion extends out of a threaded channel of a hinge,
enabling the screw to be directly pulled into the threaded channel by hand, by a user, without the use of a tool.

18. The screw of claim 17, wherein the screw head comprises a first surface having a driver slot thereon, and a second surface, wherein the second surface of the screw head faces away from the first surface.

19. The screw of claim 17, wherein a length of the non-threaded second portion is greater than or equal to a length of the threaded first portion, resulting in a user having greater leverage to break off and discard the non-threaded second portion at the breakaway.

20. The screw of claim 19, wherein a ratio of the length of the threaded first portion to the length of the non-threaded second portion is about 1:1 to about 0.775:1.

21. The screw of claim 17, enabling the screw to engage threads of the threaded channel.

22. The screw of claim 17, wherein an axial cross-section of the distal end of the non-threaded second portion is substantially circular.

23. The screw of claim 22, wherein an outer surface of the non-threaded second portion is substantially smooth.

24. The screw of claim 17, wherein a diameter of the non-threaded second portion is less than a diameter of the threaded first portion of the elongated stem.

25. The screw of claim 17, wherein the diameter of the breakaway is less than or equal to 0.015 in., when the diameter of the elongated stem is essentially equal to 0.040 in.

26. A screw, comprising:
a screw, having a screw head, comprising:
a threaded first portion and a non-threaded second portion extending from the distal end of the threaded first portion and a breakaway therebetween,
wherein a proximal end of the threaded first portion is mechanically and physically coupled to a second surface of the screw head so that it is not releasably coupled to the second surface of the screw head,
wherein the screw is adapted to be manipulated by hand by an user without the use of a tool,
wherein the physical coupling between the second surface of the screw head and the proximal end of the threaded first portion is not a breakaway,
wherein the breakaway releasably couples the non-threaded second portion to the distal end of the threaded first portion,
wherein at least the distal end of the non-threaded second portion extends out of a threaded channel of a hinge,
enabling the screw to be aligned by manipulating the non-threaded second portion directly by hand by a user without the use of a tool.

27. The screw of claim 23, wherein the screw head comprises a first surface having a driver slot thereon, and a second surface, wherein the second surface of the screw head faces away from the first surface.

28. The screw of claim 26, wherein a length of the non-threaded second portion is greater than or equal to a length of the threaded first portion, resulting in a user having greater leverage to break off and discard the non-threaded second portion at the breakaway.

29. The screw of claim 28, wherein a ratio of the length of the threaded first portion to the length of the non-threaded second portion is from about 1:1 to about 0.775:1.

30. The screw of claim 26, wherein the threads of the threaded first portion of the elongated stem are adapted to engage threads of a threaded channel of a hinge when the non-threaded second portion has been manipulated directly by hand by a user without the use of a tool.

31. The screw of claim 26, wherein an axial cross-section of the distal end of the non-threaded second portion is substantially circular.

32. The screw of claim 30, wherein an outer surface of the non-threaded second portion is substantially smooth.

33. The screw of claim 26, wherein a diameter of the non-threaded second portion is less than the diameter of the threaded first portion of the elongated stem.

34. The screw of claim 26, wherein a diameter of the breakaway being less than or equal to 0.015 in., when the diameter of the elongated stem is essentially equal to 0.040 in., results in the non-threaded second portion of the elongated stem of the screw being adapted to be broken off cleanly at the breakaway.

35. A screw, comprising:
a screw, having a screw head, comprising:
a threaded first portion and a non-threaded second portion extending from the distal end of the threaded first portion and a breakaway therebetween, wherein a proximal end of the threaded first portion is mechanically and physically coupled to a second surface of the screw head so that it is not releasably coupled to the second surface of the screw head, wherein the physical coupling between the second surface of the screw head and the proximal end of the threaded first portion is not a breakaway, wherein the breakaway releasably couples the non-threaded second portion to the distal end of the threaded first portion, wherein the diameter of the breakaway is less than or equal to 0.015 in., enabling the non-threaded second portion of the elongated stem of the screw to be directly decoupled cleanly from the threaded first portion of the elongated stem at the breakaway by hand, without the use of a tool.

36. The screw of claim 35, wherein the screw head comprises a first surface having a driver slot thereon, and a second surface, wherein the second surface of the screw head faces away from the first surface.

37. The screw of claim 35, wherein a length of the non-threaded second portion is greater than or equal to a length of the threaded first portion, resulting in a user having greater leverage to break off and discard the non-threaded second portion at the breakaway.

38. The screw of claim 37, wherein a ratio of the length of the threaded first portion to the length of the non-threaded second portion is from about 1:1 to about 0.775:1.

39. The screw of claim 35, wherein at least a distal end of the non-threaded second portion extends out of a threaded channel of a hinge.

40. The screw of claim 39, wherein the screw is adapted to be aligned in the process of engaging threads in a threaded channel of a hinge with threads of the screw when at least the distal end of the non-threaded second portion extends out of the threaded channel, by directly manipulating the threaded first portion by hand by a user without the use of a tool.

41. The screw of claim 35, wherein an axial cross-section of a distal end of the non-threaded second portion is substantially circular.

42. The screw of claim 35, wherein an outer surface of the non-threaded second portion is substantially smooth.

43. The screw of claim 35, wherein the diameter of the threaded first portion is greater than the diameter of the non-threaded second portion of the elongated stem.

44. The screw of claim 35, wherein the diameter of the breakaway is less than or equal to 0.015 in., when the diameter of the elongated stem is essentially equal to 0.040 in., enabling the non-threaded second portion of the elongated stem of the screw to be broken off cleanly at the breakaway.

45. A screw, comprising:
a screw, having a screw head, comprising:
a threaded first portion and a non-threaded second portion extending from the distal end of the threaded first portion and a breakaway therebetween,
wherein a proximal end of the threaded first portion is mechanically and physically coupled to a second surface of the screw head so that it is not releasably coupled to the second surface of the screw head,
wherein the physical coupling between the second surface of the screw head and the proximal end of the threaded first portion is not a breakaway,
wherein the breakaway releasably couples the non-threaded second portion to the distal end of the threaded first portion,
wherein a diameter of the non-threaded second portion is smaller than a diameter of the threaded first portion of the elongated stem,
wherein an axial cross-section of a distal end of the non-threaded second portion is substantially circular,
enabling the screw to be manipulated by the non-threaded second portion directly by hand by a user without the use of a tool.

46. The screw of claim 45, wherein the screw head comprises a first surface having a driver slot thereon, and a second surface, wherein the second surface of the screw head faces away from the first surface.

47. The screw of claim 43, wherein a length of the non-threaded second portion is greater than or equal to a length of the threaded first portion, resulting in a user having greater leverage to break off and discard the non-threaded second portion at the breakaway.

48. The screw of claim 47, wherein a ratio of the length of the threaded first portion to the length of the non-threaded second portion is from about 1:1 to about 0.775:1.

49. The screw of claim 43, wherein at least a distal end of the non-threaded second portion extends out of a threaded channel of a hinge.

50. The screw of claim 43, wherein the screw is aligned in the process of engaging threads in a threaded channel of a hinge with threads of the screw by directly manipulating the threaded first portion by hand by a user without the use of a tool.

51. The screw of claim 43, wherein an outer surface of the non-threaded second portion is substantially smooth.

52. The screw of claim 43, wherein the diameter of the breakaway is less than or equal to 0.015 in., when the diameter of the elongated stem is essentially equal to 0.040 in., and wherein the non-threaded second portion of the elongated stem of the screw is adapted to be broken off cleanly at the breakaway.

53. A screw, comprising:
a screw, having a screw head, comprising:
a threaded first portion and a non-threaded second portion extending from the distal end of the threaded first portion and a breakaway therebetween,
wherein a proximal end of the threaded first portion is mechanically and physically coupled to a second surface of the screw head so that it is not releasably coupled to the second surface of the screw head,
wherein the physical coupling between the second surface of the screw head and the proximal end of the threaded first portion is not a breakaway,
wherein the breakaway releasably couples the non-threaded second portion to the distal end of the threaded first portion,
wherein the breakaway releasably couples the non-threaded second portion to the distal end of the threaded first portion,
wherein a diameter of the non-threaded second portion is smaller than a diameter of the threaded first portion of the elongated stem, and
wherein an outer surface of the non-threaded second portion is substantially smooth,
enabling the screw to be inserted into a threaded channel of a hinge by the non-threaded second portion directly by hand by a user without the use of a tool, so that threads of the threaded channel are not engaged by the non-threaded second portion as the non-threaded second portion is removed from the threaded channel.

54. The screw of claim 53, wherein the screw head comprises a first surface having a driver slot thereon, and a second surface, wherein the second surface of the screw head faces away from the first surface.

55. The screw of claim 53, wherein a length of the non-threaded second portion is greater than or equal to a length of the threaded first portion, resulting in a user having greater leverage to break off and discard the non-threaded second portion at the breakaway.

56. The screw of claim 55, wherein a ratio of the length of the threaded first portion to the length of the non-threaded second portion is from about 1:1 to about 0.775:1.

57. The screw of claim 53, wherein at least a distal end of the non-threaded second portion extends out of the threaded channel.

58. The screw of claim 53, wherein the screw is aligned in the process of engaging threads in a threaded channel of a hinge with threads of the screw by directly manipulating the threaded first portion by hand by a user without the use of a tool.

59. The screw of claim 53, wherein the diameter of the breakaway is less than or equal to 0.015 in., when the diameter of the elongated stem is essentially equal to 0.040 in., and wherein the non-threaded second portion of the elongated stem of the screw is adapted to be broken off cleanly at the breakaway.

60. The screw of claim 53, wherein an axial cross-section of a distal end of the non-threaded second portion is substantially circular.

61. The screw of claim 1, wherein a width of the driver slot is from about 0.045 in. to about 0.055 in.

62. A screw, comprising:
a screw head, comprising:
  a first surface having a driver slot thereon, and a second surface, wherein the second surface of the screw head faces away from
  the first surface;
an elongated stem, comprising:
  a threaded first portion and a non-threaded second portion extending from the distal end of the threaded first portion and a breakaway therebetween,
  wherein a proximal end of the threaded first portion is mechanically and physically coupled to the second surface of the screw head,
  wherein the physical coupling between the second surface of the screw head and the proximal end of the threaded first portion is not a breakaway,
  wherein the breakaway releasably couples the non-threaded second portion to the distal end of the threaded first portion,
  wherein a diameter of the non-threaded second portion is smaller than a diameter of the threaded first portion of the elongated stem enabling the non-threaded second portion to pass through a threaded channel of a hinge without contacting a wall of the threaded channel, enabling the screw to be manipulated by the non-threaded second portion directly by hand by a user without the use of a tool as the non-threaded second portion is removed from the threaded channel.

* * * * *

(12) EX PARTE REEXAMINATION CERTIFICATE (9298th)
United States Patent
Tedeschi

(10) Number: US 8,070,403 C1
(45) Certificate Issued: Sep. 11, 2012

(54) SCREW WITH BREAKAWAY AND METHODS OF USING THE SAME

(75) Inventor: Nancy Tedeschi, Rexford, NY (US)

(73) Assignee: Eyecharms, LLC, East Wenatchee, WA (US)

Reexamination Request:
No. 90/012,157, Feb. 21, 2012

Reexamination Certificate for:
Patent No.: 8,070,403
Issued: Dec. 6, 2011
Appl. No.: 12/187,254
Filed: Aug. 6, 2008

Related U.S. Application Data

(60) Provisional application No. 60/993,726, filed on Sep. 14, 2007, and provisional application No. 60/963,519, filed on Aug. 6, 2007.

(51) Int. Cl.
*F16B 31/00* (2006.01)

(52) U.S. Cl. ................. 411/5; 411/2; 411/403; 411/411; 411/424

(58) Field of Classification Search ................. None
See application file for complete search history.

(56) References Cited

To view the complete listing of prior art documents cited during the proceeding for Reexamination Control Number 90/012,157, please refer to the USPTO's public Patent Application Information Retrieval (PAIR) system under the Display References tab.

*Primary Examiner* — Jeffrey R. Jastrzab

(57) ABSTRACT

A fastener with a breakaway and methods of using the same. In one embodiment the fastener is a screw having a head and elongated stem, adapted to be easily manipulated by a user when using the screw as a fastener in a hinge or joint. A means of holding a screw by providing a breakaway tab or non-threaded second portion of the elongated stem which can be used to align and insert the screw into a screw hole in the process of engaging threads in the screw hole with threads of the screw. After engaging the threads in the screw hole, such as after the screw has been essentially completely inserted into the screw hole, the breakaway tab or non-threaded second portion of the elongated stem of the screw may be broken off at a breakaway and discarded.

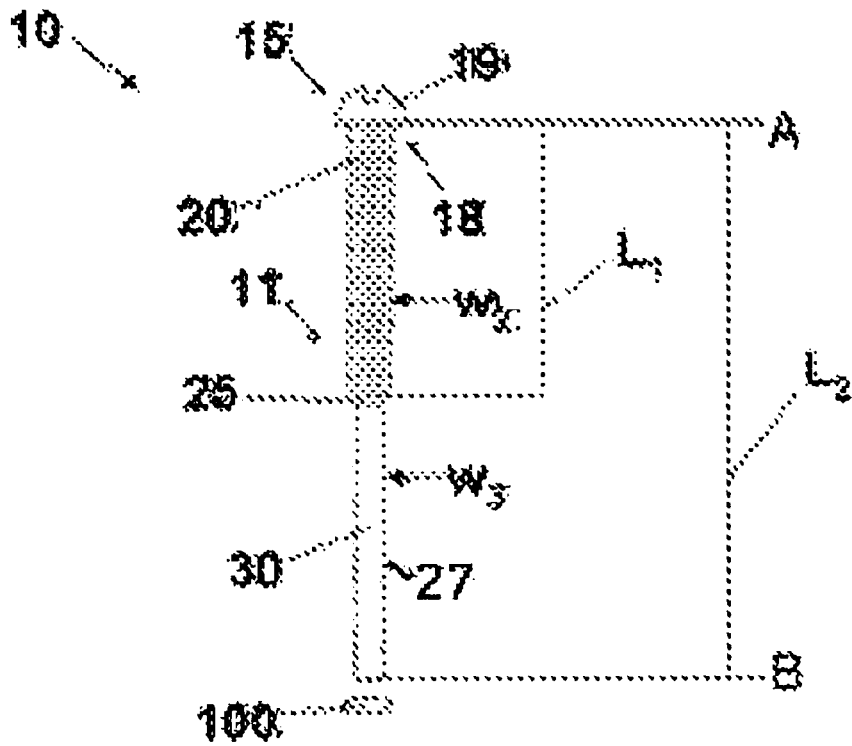

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-62 is confirmed.

* * * * *